United States Patent
Kyogaku

(10) Patent No.: US 7,138,759 B2
(45) Date of Patent: Nov. 21, 2006

(54) ELECTRON-EMITTING DEVICE, ELECTRON SOURCE, AND IMAGE DISPLAY APPARATUS

(75) Inventor: Masafumi Kyogaku, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 10/789,995

(22) Filed: Mar. 2, 2004

(65) Prior Publication Data

US 2004/0183428 A1    Sep. 23, 2004

(30) Foreign Application Priority Data

Mar. 7, 2003    (JP)    ............... 2003-061255

(51) Int. Cl.
*H01J 1/304*    (2006.01)
(52) U.S. Cl. .................. 313/497; 313/495; 313/346 R
(58) Field of Classification Search ........ 313/309–311, 313/495–497, 346 R, 351
See application file for complete search history.

(56) References Cited

U.S. PATENT DOCUMENTS

| | | | |
|---|---|---|---|
| 4,728,851 A | 3/1988 | Lambe | 313/309 |
| 4,904,895 A | 2/1990 | Tsukamoto et al. | 313/336 |
| 5,382,867 A * | 1/1995 | Yuji et al. | 313/309 |
| 6,259,422 B1 * | 7/2001 | Hamamoto | 345/74.1 |
| 6,278,234 B1 * | 8/2001 | Ono et al. | 313/495 |
| 2002/0003399 A1 | 1/2002 | Uemura et al. | 313/495 |
| 2002/0031972 A1 * | 3/2002 | Kitamura et al. | 445/3 |
| 2002/0060514 A1 | 5/2002 | Nakamoto | 313/311 |
| 2002/0060516 A1 * | 5/2002 | Kawate et al. | 313/495 |
| 2002/0074947 A1 * | 6/2002 | Tsukamoto | 315/169.3 |
| 2002/0097204 A1 | 7/2002 | Tsukamoto et al. | 345/74.1 |
| 2002/0109455 A1 * | 8/2002 | Mitsutake et al. | 313/495 |
| 2003/0006684 A1 * | 1/2003 | Kawate et al. | 313/311 |
| 2003/0124944 A1 | 7/2003 | Kyogaku et al. | 445/6 |

(Continued)

FOREIGN PATENT DOCUMENTS

JP    8-102246    4/1996

(Continued)

OTHER PUBLICATIONS

Iijima, Sumio, "Helical Microtubules of Graphitic Carbon," Nature vol. 354, pp. 56-58 (1991).

*Primary Examiner*—Ashok Patel
*Assistant Examiner*—Christopher Raabe
(74) *Attorney, Agent, or Firm*—Fitzpatrick, Cella, Harper & Scinto

(57) ABSTRACT

To provide an electron-emitting device that can be used to manufacture an image forming apparatus having a superior display quality and in which the development of the abnormal light emission point is suppressed and the unevenness of brightness is not caused. The electron-emitting device includes: a cathode electrode and a gate electrode, which are formed on a base surface and opposed to each other with a space therebetween; and an electron-emitting film which is located on the cathode electrode, and in the electron-emitting device, the electron-emitting film has two end portions (A and B) in a plane substantially parallel to the base surface in a direction substantially perpendicular to a direction along which the cathode electrode and the gate electrode are opposed to each other, and a structure is used in which electric field strengths applied between each of the two end portions (A and B) of the electron-emitting film and the gate electrode are made weaker than an electric field strength applied between a region between the two end portions (A and B) of the electron-emitting film and the gate electrode at a time of driving.

12 Claims, 7 Drawing Sheets

U.S. PATENT DOCUMENTS

2003/0162464 A1    8/2003   Kyogaku et al. .............. 445/24

FOREIGN PATENT DOCUMENTS

| JP | 2001-52598   | 2/2001  |
|----|--------------|---------|
| JP | 2002-25477   | 1/2002  |
| JP | 2002-150925  | 5/2002  |
| JP | 2002-289087  | 10/2002 |

\* cited by examiner

DIRECTION ALONG WHICH CATHODE ELECTRODE 2 AND GATE ELECTRODE 3 ARE OPPOSED TO EACH OTHER

ELECTRON-EMITTING DEVICE, ELECTRON SOURCE, AND IMAGE DISPLAY APPARATUS

BACKGROUND OF THE INVENTION

1. Field of the Invention

The present invention relates to an electron-emitting device having a film containing an electron-emitting material, an electron source in which a large number of electron-emitting devices are arranged, and an image display apparatus using the electron source.

2. Related Background Art

Recently, a carbon fiber such as a carbon nanotube (hereinafter referred to as a "CNT") serving as a cold cathode material is attracting attention. The carbon nanotube is a fullerene having a cylindrical structure in which graphite of several layers or a single layer is wound, and is a new carbon material discovered in 1991 (Nature, 354, (1991) 56). Further, an application of a carbon nanotube to an image display apparatus using an electron source in which a large number of minute electron-emitting devices are two-dimensionally formed is being attempted.

Up to now, there has been known an example of a field emission type electron-emitting device in which a conical cathode electrode is formed on a substrate in a substantially vertical direction, a so-called "Spindt type". In the Spindt type electron-emitting device, an insulating layer and a gate electrode are formed on the substrate and the conical cathode electrode made of Mo or the like is formed in a hole obtained by micro fabrication. An anode electrode and a phosphor are opposed to the gate electrode.

The above-mentioned Spindt type electron-emitting device utilizes an electron field emission from a sharpened tip portion of a cathode electrode. However, with respect to the device formed by the micro fabrication, it is difficult to increase the number of devices per pixel in the image display apparatus.

In order to reduce a voltage for field emission, it is important to increase an aspect ratio in the sharpened tip portion. However, there is a limitation on sharpening of the tip portion by a micro fabrication technique and it is difficult to reduce an electric field strength required for field emission.

On the other hand, a carbon fiber such as a CNT has a shape of a high aspect ratio with a minute diameter of several tens of nm and a length of several hundreds of nm to several µm. Therefore, when the carbon fiber is used for the electron source, it can be driven at low voltage. In addition, because a large allowable current capacity is obtained, the carbon fiber has a large number of characteristics such as a stable large emission current, which are advantageous on an application to the image display apparatus (for example, see Japanese Patent Application Laid-Open No. 2002-025477).

On the other hand, there has been known an example of an electron-emitting device having a lateral structure (for example, see U.S. Pat. No. 4,728,851 and U.S. Pat. No. 4,904,895). A cathode electrode whose tip is sharpened and a gate electrode to extract electrons from the tip of the cathode electrode are formed parallel to a substrate. An anode electrode is located in a direction perpendicular to a direction along which the gate electrode and the cathode electrode are opposed.

Even in such a lateral type electron-emitting device, as disclosed in, for example, Japanese Patent Application Laid-Open Nos. 2001-052598, 2002-150925, and the like, an attempt to improve a device characteristic is made by using a carbon fiber such as a carbon nanotube for an electron-emitting region.

By using an electron source substrate in which a plurality of electron-emitting devices as described above are formed, an image forming apparatus can be constructed in combination with an image forming member composed of a phosphor and the like.

SUMMARY OF THE INVENTION

A conventional electron source composed of the lateral type electron-emitting device using the carbon fiber such as the carbon nanotube for the electron-emitting region has the following problems.

FIG. 9 shows an example of the lateral type electron-emitting device. FIG. 9 is a plan view when the lateral type electron-emitting device is viewed from above the surface of a base, in which reference numeral 91 denotes a substrate, 92 denotes a cathode electrode, 93 denotes a gate electrode, and 94 denotes an electron-emitting film.

In general, in the lateral type electron-emitting device, the electron-emitting film 94, which includes a plurality of carbon fibers, patterned along an edge of the cathode electrode 92 opposed to the gate electrode 93 is formed on the cathode electrode 92.

The presence or absence of the electron emission from the electron-emitting film 94 is determined according to the electric field strength effectively applied to an electron-emitting part of the carbon fiber. More specifically, this is determined according to (1) a macro electric field strength in accordance with a distance from the opposite gate electrode and (2) an electric field enhancing effect specified by, for example, a shape of the carbon fiber.

When a uniform distance is maintained between the electron-emitting film 94 and the gate electrode 93, that is, when a macro electric field is uniform, the ease of electron emission is determined according to nonuniformity of the electric field enhancing effect resulting from unevenness of the electron-emitting film 94. In other words, when there are nonuniformity of shape of the carbon fiber, nonuniformity of density thereof, and the like, an electron-emitting characteristic becomes nonuniform.

(1) A method of patterning a catalytic layer and growing a carbon fiber in an area in which the patterned catalytic layer was being dispoed, (2) a method of preparing the carbon fibers and then disposing a film including the carbon fibers in an arbitrary area, or the like can be used as a method of forming the electron-emitting film 94 along the edge of the cathode electrode 92.

FIG. 10 is a schematic cross sectional view of the electron-emitting device shown in FIG. 9 along the edge portion of the cathode electrode 92.

In the case of (1), a growth rate tends to be different between the edge portions 95 of the electron-emitting film 94 and the other region. Therefore, nonuniformity of the shape of the carbon fiber, the density thereof, and the like is likely to be caused among positions. As a result, the electron-emitting characteristic is likely to be different between the edge portions and the other region. It is difficult to make the growth rate of the carbon fiber in the edge portions precisely coincide with the growth rate of the carbon fiber in the other region, so that this becomes a factor in the nonuniformity of each electron-emitting device. For example, as shown in FIG. 9, with respect to a structure, the carbon fibers in edge portions 95 of the patterned electron-emitting film 94 are likely to be different from the carbon fibers in the other region (central region).

In the case of (2), a structure of the carbon fiber and a formation density thereof can be made relatively uniform. However, as shown in FIG. 10, the edge portions 95 are formed at the edge regions of the patterned area. In the edge portions 95, the electric field enhancing effect resulting from electric field concentration generally becomes larger, so that a threshold voltage to the electron emission reduces.

Whatever method is used, when an electron-emitting region having a finite area is formed, there is a problem in that the nonuniformity of the electron-emitting characteristic in the electron-emitting region is caused. In particular, the electron-emitting characteristic is likely to be different between the edge portions and the central region. Therefore, when the entire surface of the above-mentioned electron-emitting film 94 is used for the electron-emitting devices of a display apparatus, there is a problem in that the electron-emitting region whose edge portions 95 have a low threshold is caused as an abnormal light emission point.

Also, there is a problem in that non-uniformity of brightness is likely to be caused in an image forming apparatus using the above-mentioned electron-emitting device.

The present invention has been made to solve the above-mentioned problems. An object of the present invention is to provide an electron-emitting device, and an electron source, which can be used to manufacture an image forming apparatus having a superior display quality and in which the development of the abnormal light emission point is suppressed and the non-uniformity of brightness is not caused.

The present invention has been made by an earnest study to solve the above-mentioned problems and is provided through the following electron-emitting device.

That is, an electron-emitting device according to the present invention is characterized in that:

the device includes: a cathode electrode and a gate electrode, which are formed on a surface of a substrate and opposed to each other with a space therebetween; and a film containing an electron-emitting material, which is located on the cathode electrode, and in the electron-emitting device, and that the film containing the electron-emitting material has two end portions in a plane substantially parallel to the surface of the substrate in a direction substantially perpendicular to a direction along which the cathode electrode and the gate electrode are opposed to each other, and a structure is used in which electric field strengths applied between each of the two end portions of the film containing the electron-emitting material and the gate electrode are made weaker than an electric field strength applied between a region between the two end portions of the film containing the electron-emitting material and the gate electrode at a time of driving.

Alternatively, an electron-emitting device according to the present invention is characterized in that:

the device includes: a cathode electrode and a gate electrode, which are formed on a surface of a substrate and opposed to each other with a space therebetween; and a film containing an electron-emitting material, which is located on the cathode electrode, and in the electron-emitting device, and that the film containing the electron-emitting material has two end portions in a plane substantially parallel to the surface of the substrate in a direction substantially perpendicular to a direction along which the cathode electrode and the gate electrode are opposed to each other, and an area of a portion of the cathode electrode between each of the two end portions of the film containing the electron-emitting material and the gate electrode in the plane substantially parallel to the surface of the substrate is larger than an area of a portion of the cathode electrode between a region located between the two end portions of the film containing the electron-emitting material and the gate electrode.

Alternatively, an electron-emitting device according to the present invention is characterized in that:

the device includes: a cathode electrode and a gate electrode, which are formed on a surface of a substrate and opposed to each other with a space therebetween; and a film containing an electron-emitting material, which is located on the cathode electrode, and in the electron-emitting device, and that the film containing the electron-emitting material has two end portions in a plane substantially parallel to the surface of the substrate in a direction substantially perpendicular to a direction along which the cathode electrode and the gate electrode are opposed to each other, and the cathode electrode has protruding portions in areas between each of the two end portions of the film containing the electron-emitting material and the gate electrode in a plane substantially parallel to the surface of the substrate, the protruding portions protruding more to the gate electrode side as compared with an area between a region located between the two end portions of the film containing the electron-emitting material and the gate electrode.

Alternatively, an electron-emitting device according to the present invention is characterized in that:

the device includes: a cathode electrode and a gate electrode, which are formed on a surface of the substrate and opposed to each other with a space therebetween; and a film containing an electron-emitting material, which is located on the cathode electrode, and in the electron-emitting device, and that the film containing the electron-emitting material has two end portions in a plane substantially parallel to the surface of the substrate in a direction substantially perpendicular to a direction along which the cathode electrode and the gate electrode are opposed to each other, and the gate electrode has a shape in which a distance therefrom to a region located between the two end portions of the film containing the electron-emitting material is shorter than a distance therefrom to each of the two end portions of the film containing the electron-emitting material.

Alternatively, an electron-emitting device according to the present invention is characterized in that:

the device includes: a cathode electrode and a gate electrode, which are formed on a surface of the substrate and opposed to each other with a space therebetween, and a film containing an electron-emitting material, which is located on the cathode electrode, and in the electron-emitting device, and that the film containing the electron-emitting material has two end portions in a plane substantially parallel to the surface of the substrate in a direction substantially perpendicular to a direction along which the cathode electrode and the gate electrode are opposed to each other, and a distance from a center line between the cathode electrode and the gate electrode to a region located between the two end portions of the film containing the electron-emitting material is shorter than a distance from the center line to each of the two end portions of the film containing the electron-emitting material.

As the film containing the electron-emitting material, a plurality of fibrous conductive materials may be used.

Further, as the film containing the electron-emitting material, a film mainly containing carbon may be used.

Further, as the film containing the electron-emitting material, a plurality of carbon fibers may be used.

Further, each of the plurality of carbon fibers may be one of a carbon nanotube, a graphite nanofiber, an amorphous carbon fiber, and a diamond fiber.

Further, according to the present invention, there is provided an electron source, including a plurality of electron-emitting devices, each of which is constructed according to the present invention as described above.

Further, according to the present invention, there is provided an image display apparatus, including:

an electron source constructed according to the present invention as described above; and a light emitting member.

According to the present invention, it is possible to provide an electron-emitting device in which an electron-emitting characteristic distribution in the electron-emitting region is small and to reduce a variation in electron-emitting characteristic between electron-emitting devices. Therefore, by using electron source in which a plurality of electron-emitting devices according to the present invention are arranged, an image forming apparatus capable of uniformly displaying an image having a preferable quality on a large area is obtained.

DESCRIPTION OF THE PREFERRED EMBODIMENT

Hereinafter, a preferred embodiment of the present invention will be described in detail with reference to the drawings. Note that the present invention is not limited to the embodiment.

Figure 1:
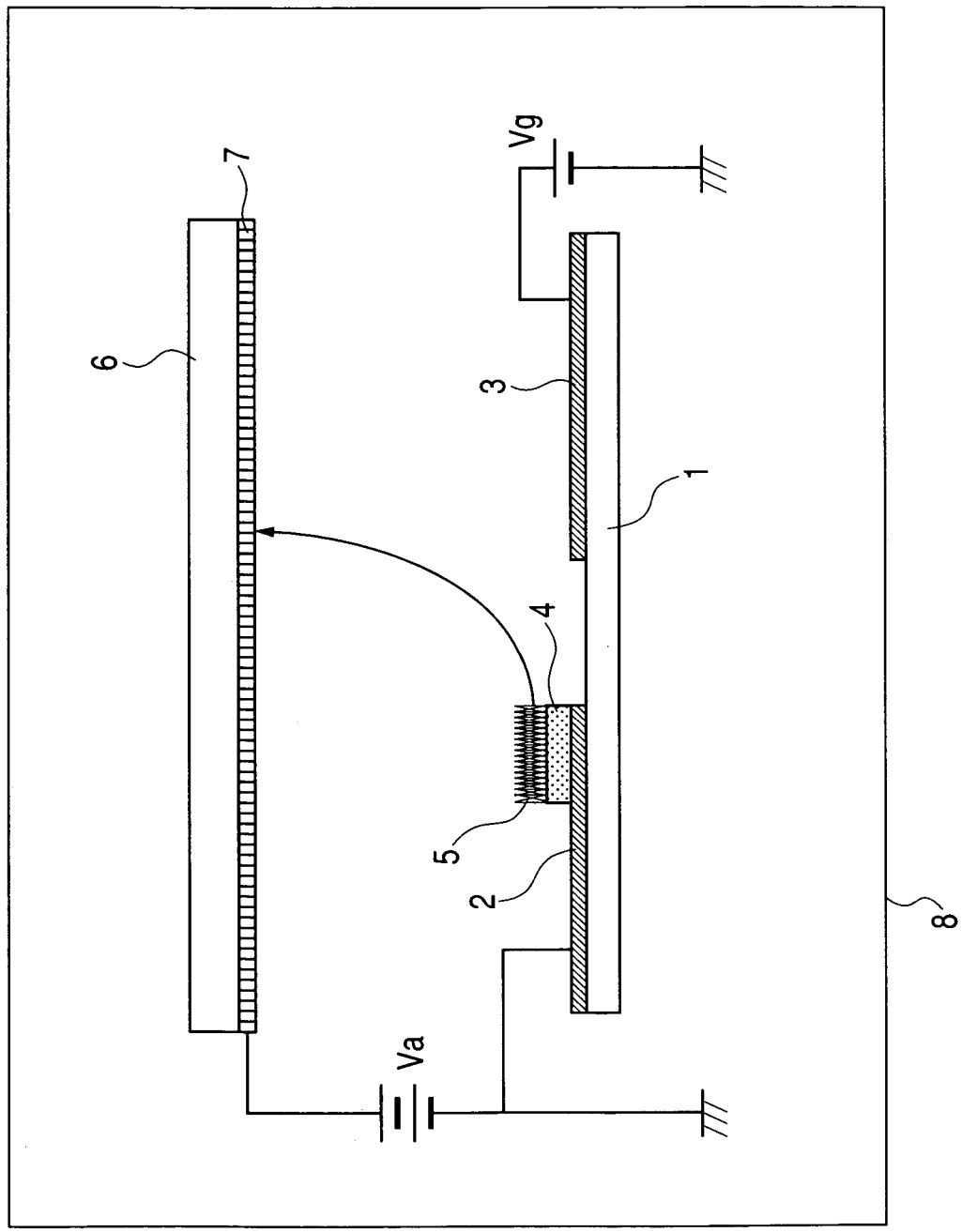
FIG. 1 is a schematic view showing a state in which an anode electrode is provided opposite to a substrate of an electron-emitting device according to the present invention, and the electron-emitting device and the anode electrode are set in a vacuum vessel.
Figure 2:
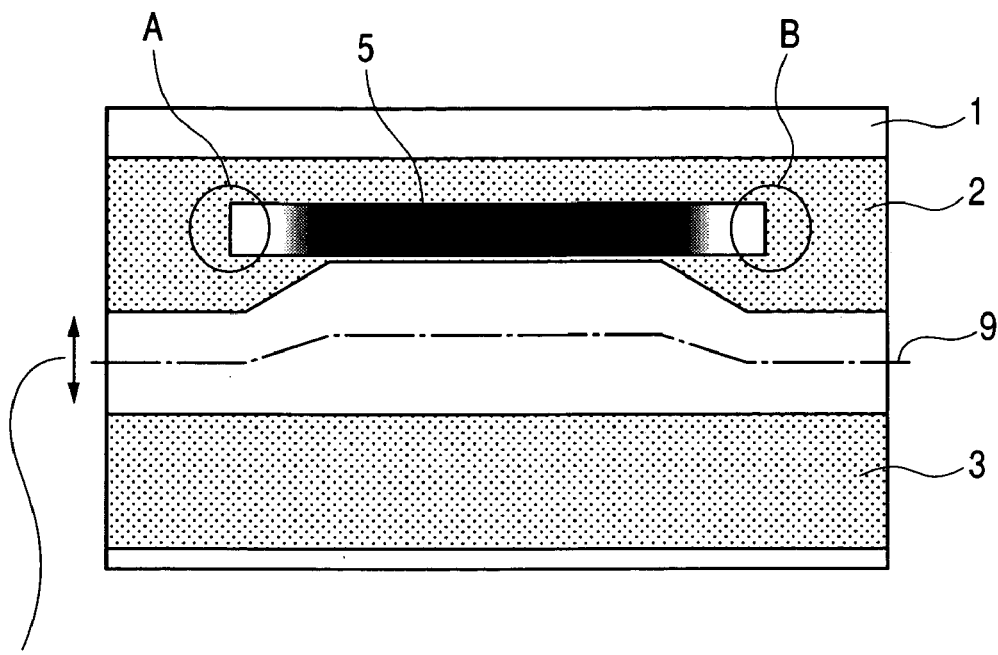
FIG. 2 is a schematic view showing an example of the electron-emitting device according to the present invention.

First, an electron-emitting device according to the present invention will be described with reference to FIGS. 1 and 2. FIG. 1 is a schematic view showing a state in which an anode electrode 7 is provided opposite to a substrate 1 of the electron-emitting device (2, 3, 4 and 5), and the electron-emitting device and the anode electrode 7 are set in a vacuum vessel 8. FIG. 2 is a schematic view showing an example of the electron-emitting device according to the present invention when it is viewed from above the substrate.

In FIG. 1, reference numeral 1 denotes a substrate (base); 2, a cathode electrode (negative electrode); 3, a gate electrode (extraction electrode); 4, a conductive layer; 5, a film containing an electron-emitting material (hereinafter referred to as "electron-emitting film"); 6, an anode substrate; 7, an anode electrode; and 8, a vacuum vessel. The vacuum vessel 8 is connected with a vacuum evacuation apparatus (not shown). In some cases, a structure including the cathode electrode 2 and the conductive layer 4 is called the cathode electrode. When the electron-emitting film 5 may be mechanically and electrically connected directly with the cathode electrode 2 in a stable state, the conductive layer 4 is not necessarily provided.

As shown in FIG. 2, the electron-emitting film 5 has two end portions A and B in a plane substantially parallel to a surface of the substrate 1 in a direction substantially perpendicular to a direction along which the cathode electrode 2 and the gate electrode 3 are opposed to each other.

When configurations and locations of the cathode electrode 2, the gate electrode 3, and the electron-emitting film 5 are suitably arranged, there is provided a structure in which electric field strengths applied between each of the end portions A and B of the electron-emitting film 5 and the gate electrode 3 are made weaker than an electric field strength applied between a region between the two end portions A and B of the electron-emitting film 5 and the gate electrode 3 at the time of driving.

According to the structure, the electron emissions from the two end portions A and B of the electron-emitting film 5 may be suppressed, so that the electron emission from the region between the two end portions A and B can be controlled.

Any structure may be adopted for the electron-emitting device according to the present invention as long as it is a structure in which the electric field strengths applied between each of the end portions A and B of the electron-emitting film 5 and the gate electrode 3 are made weaker than the electric field strength applied between the region between the two end portions A and B of the electron-emitting film 5 and the gate electrode 3 (such a structure will hereinafter be referred to as "electric field control structure").

Specific examples of the electric field control structure according to the present invention are shown in FIGS. 2 to 7. The structures of the electron-emitting devices shown in FIGS. 2 to 7 are only examples of the present invention. Note that, in FIGS. 2 to 7, the same references are provided to the same members.

Figure 3:
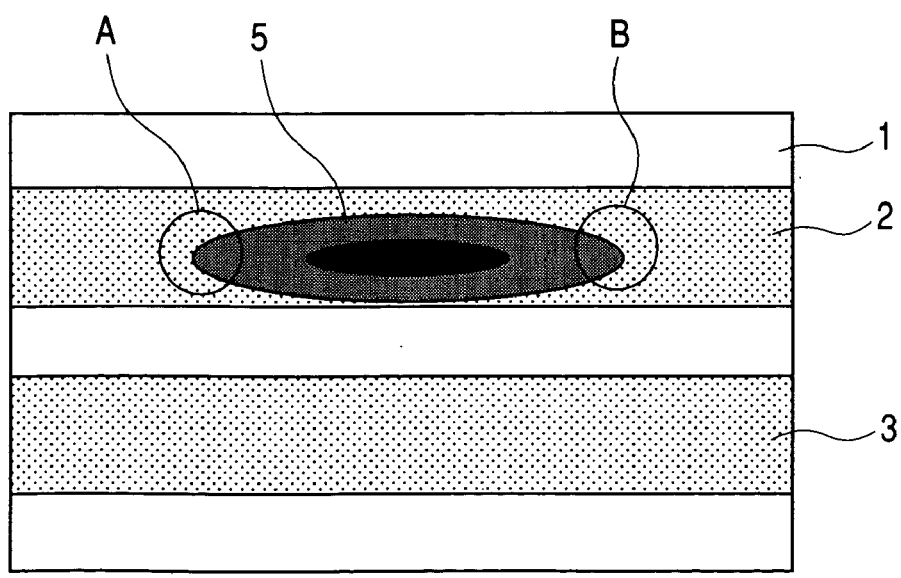
FIG. 3 is a schematic view showing an example of an electron-emitting device according to the present invention.
Figure 4:
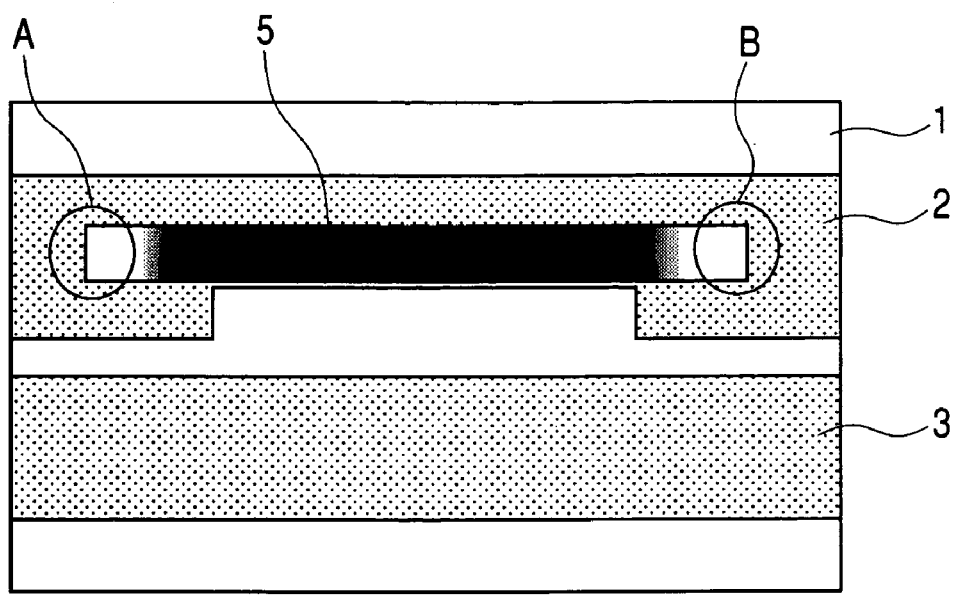
FIG. 4 is a schematic view showing an example of an electron-emitting device according to the present invention.
Figure 5:
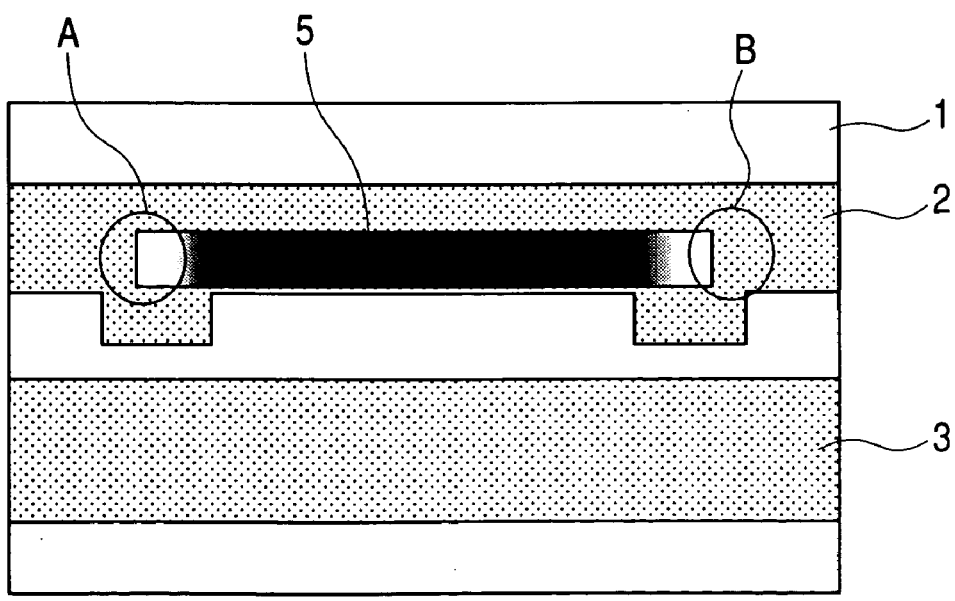
FIG. 5 is a schematic view showing an example of an electron-emitting device according to the present invention.
Figure 6:
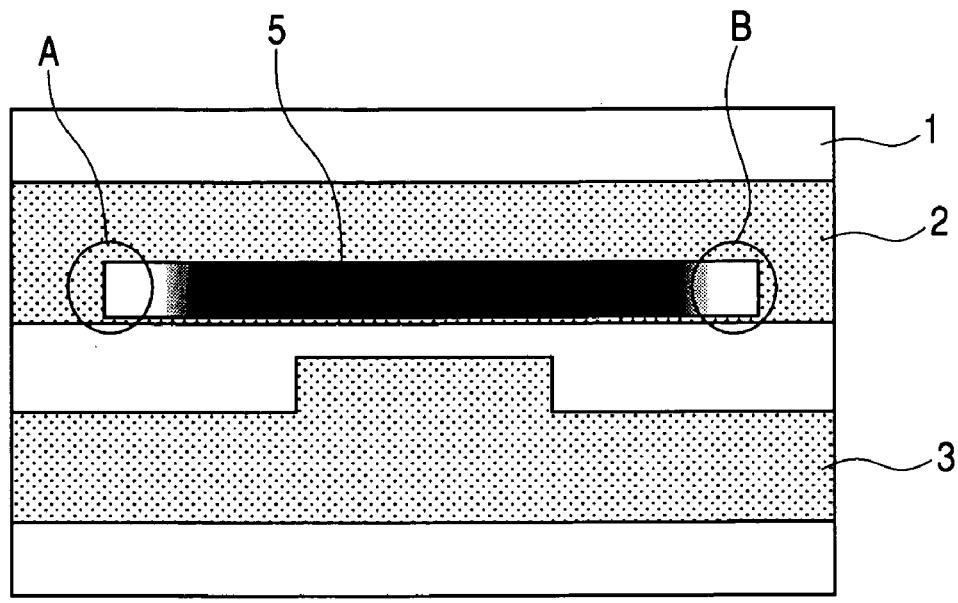
FIG. 6 is a schematic view showing an example of an electron-emitting device according to the present invention.
Figure 7:
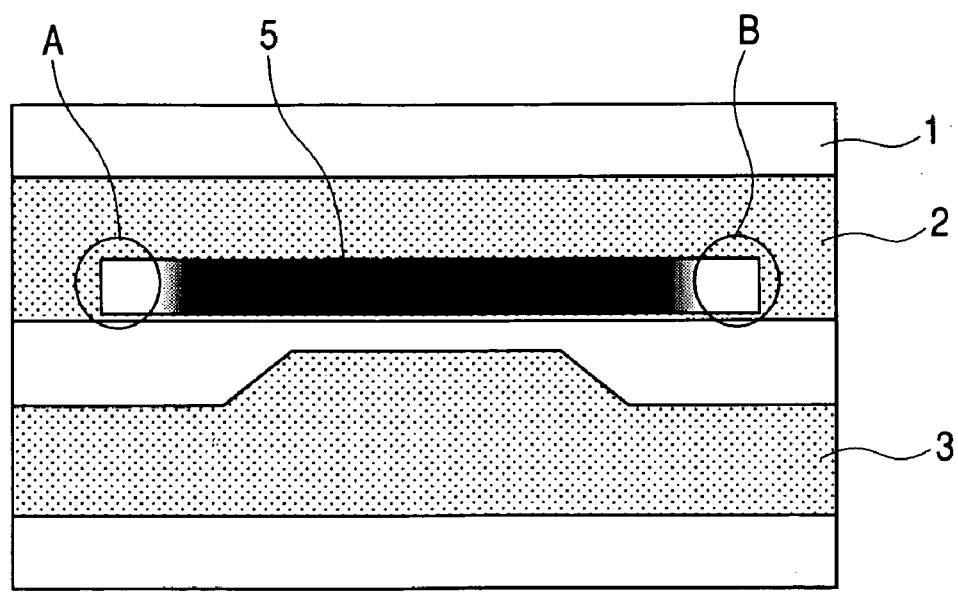
FIG. 7 is a schematic view showing an example of an electron-emitting device according to the present invention.

The above-mentioned electric field control structure according to the present invention can be realized by:

(1) a structure in which an area of a portion of the cathode electrode 2 between each of the two end portions A and B of the electron-emitting film 5 and the gate electrode 3 in the plane substantially parallel to the surface of the substrate 1 is larger than an area of a portion of the cathode electrode 2 between the region located between the two end portions A and B of the electron-emitting film 5 and the gate electrode 3, such as the structure shown in FIG. 2, 3, 4, or 5;

(2) a structure in which the cathode electrode 2 has protruding portions in areas between each of the two end portions A and B of the electron-emitting film 5 and the gate electrode 3 in the plane substantially parallel to the surface of the substrate 1 and the protruding portions protrude more to the gate electrode 3 side as compared with an area between the region located between the two end portions A and B of the electron-emitting film 5 and the gate electrode 3, such as the structure shown in FIG. 2, 4, or 5;

(3) a structure in which the gate electrode 3 has a shape in which a distance therefrom to the region located between the two end portions A and B of the electron-emitting film 5 is shorter than a distance therefrom to each of the two end portions A and B of the electron-emitting film 5, such as the structure shown in FIG. 3, 6, or 7; or (4) a structure in which a distance from a center line 9 (see FIG. 2) between the cathode electrode 2 and the gate electrode 3 to the region located between the two end portions A and B of the electron-emitting film 5 is shorter than a distance from the center line 9 to each of the two end portions A and B of the electron-emitting film 5, such as the structure 'shown in FIG. 2, 3, 4, 5, 6, or 7.

Next, an example of a process of manufacturing the electron-emitting device according to the present invention will be described. Here, an example in which a carbon fiber is used as an electron-emitting material and grown using a catalytic layer located on the cathode electrode will be described. Materials and sizes described below are only examples, and the present invention is not limited to values and materials described below. An electron-emitting material which can be applied to the present invention is not limited to the carbon fiber as described above. Further, an example in which the carbon fiber is grown on the cathode electrode will be described here. However, the carbon fiber may be formed in advance and then located on the cathode electrode.

High melting glass such as quartz may be used for the substrate 1. Using a general semiconductor device manufacturing process technique, the cathode electrode 2 and the gate electrode 3 are formed on the substrate 1 and a catalytic layer is formed in a desired region on the cathode electrode 2. Note that, it is preferable to form not a continuous film but an "island-shaped film" or a "film composed of a plurality of particles" as the catalytic layer. A catalytic material containing metal such as Fe, Co, Ni, or Pd, an alloy containing the catalytic material, or the like can be used for the catalytic layer. In particular, it is preferable to use Pd or Co. It is more preferable to use an alloy of Pd and Co.

In some cases, the conductive layer 4 as shown in FIG. 1 is provided between the cathode electrode 2 and the catalytic layer. For example, a metallic nitride or a metallic oxide can be used for the conductive layer and a function of easily forming the electron-emitting material in a later step can be provided thereto in some cases.

Subsequently, while the substrate is heated at the order of 400° C. to 800° C., an organic gas is introduced into the vacuum vessel 8, so that a plurality of carbon fibers are formed in a region in which the catalytic layer is formed. The carbon fibers serve as the electron-emitting material.

The carbon fiber, depending on the temperature during growing, the kind of organic gas, the concentration of the organic gas, and the like, has in many cases a diameter of the order of 5 nm to 250 nm and a length of the order of several tens of nm to several µm and is fibrously extended while being partially bent (or straightened in some condition). It is preferable that a thickness of the film composed of the plurality of carbon fibers (electron-emitting film 5) is equal to or smaller than an average distance between the gate electrode 3 and the cathode electrode 2, with respect to the controllability of the electric field. Note that, when the above-mentioned heating temperature is further increased, a so-called carbon nanotube can be also formed.

A conductive fibrous material is easy to obtain a large aspect ratio (length-to-width) and to enhance an electric field, so that electrons can be emitted at low voltage (driving voltage). Therefore, such a material is preferably used as the electron-emitting material according to the present invention.

Note that the "carbon fiber" according to the present invention can be also called a "columnar substance containing mainly carbon" or a "linear substance containing mainly carbon". In addition, the "carbon fiber" can be also called a "fiber containing mainly carbon". More specifically, the "carbon fiber" according to the present invention includes a carbon nanotube, a graphite nanofiber, an amorphous carbon fiber, and a diamond fiber.

A structure of the carbon fiber is described in, for example, Japanese Patent Application Laid-Open No. 2000-075167. The cylindrical form of graphene (multiple cylindrical structure is called a multi-wall nanotube) is called a carbon nanotube, and its threshold minimizes in a structure in which the distal end of the tube is open. More specifically, the carbon nanotube is a fibrous substance in which graphen is located so as to surround (cylindrically) the longitudinal axis (fiber axis). In other words, the carbon nanotube is a fibrous substance in which graphen is located substantially parallel to the fiber axis.

Also, a fibrous substance in which graphenes are stacked in the longitudinal direction (fiber axial direction) is called a "graphite nanofiber". In other words, the graphite nanofiber is a fibrous substance composed of a stacked graphens in which each graphene is being arranged so as not to be parallel to the fiber axis(in which each c-axis of the stacked graphens is being arranged so as not to be perpendicular to the fiber axis). Note that, it can be also said that the "c-axis" indicates a direction in which graphenes are stacked.

One plane (sheet) of graphite is called a "graphen" or a "graphen sheet". More specifically, graphite includes stacked carbon planes. Each of carbon planes has equilateral hexagons which are formed by a covalent bond produced by sp2 hybridization of carbon atoms and arranged so as to be laid. A distance between the adjacent carbon planes is about 3.354 angstroms. Each of carbon planes is called a "graphen" or a "graphen sheet".

Any of the above carbon fibers has an electron-emitting threshold of the order of 1 V/µm to 10 V/µm and is preferable as the material of an emitter (electron-emitting film 5) according to the present invention.

In particular, an electron-emitting material using a graphite nanofiber is preferably used because it can emit electrons at low electric field, obtain a large emission current, obtain a stable electron-emitting characteristic, and can be easily produced.

The above-mentioned carbon fiber can be formed by decomposing a hydrocarbon gas using the catalyst (material which promotes depositing of carbon). The carbon nanotube and the graphite nanofiber are different from each other with respect to the type of catalyst and the decomposition temperature. For example, in the case of using Pd or/and Ni, a graphite nanofiber can be generated at low temperature (temperature of 400° C. or higher). Though it is required that the generation temperature of a carbon nanotube in the case of using Fe or/and Co is 800° C. or higher, a graphite nanofiber material can be formed at low temperature in the case of using Pd or/and Ni. Therefore, the use of Pd or/and Ni is preferable in views of the influence on other members and the manufacturing cost.

For example, a hydrocarbon gas such as acetylene, ethylene, methane, propane, and propylene, a CO gas, a $CO_2$ gas, or the vapor of an organic solvent such as ethanol or acetone can be used as the above-mentioned hydrocarbon gas.

Here, a relative positional relationship between a plane which is a portion of the surface of the electron-emitting film 5, which includes an electron-emitting region, and which is substantially parallel to the surface of the substrate 1, and a plane which includes a portion of the surface of the gate electrode 3 and is substantially parallel to the surface of the substrate 1, is not particularly specified using the substrate surface as reference. These planes may be located in substantially the same plane. Even if the planes are located at separate positions, they can be applied to the electric field control structure according to the present invention. Note that, when the planes are located at separate positions, it is necessary to suppress scattering of emitted electrons on the gate electrode 3. Therefore, as shown in FIG. 1, it is preferable that the plane which includes the portion of the surface of the electron-emitting film 5 and is substantially parallel to the surface of the substrate 1 is located between the anode electrode 7 and the plane which includes the portion of the surface of the gate electrode 3 and is substantially parallel to the surface of the substrate 1.

According to the above-mentioned structure shown in FIG. 1, the rate at which electrons emitted from the cathode electrode 2 side collide with the gate electrode 3 can be reduced. As a result, an electron-emitting device having small spread of emitted electron beams and high efficiency is obtained.

The driving of the above-mentioned electron-emitting device according to the present invention will be described with reference to FIG. 1.

In FIG. 1, first, the electron-emitting device is set in the vacuum vessel 8 and a vacuum state is produced therein using an evacuation apparatus (not shown). Next, a voltage is applied such that the gate electrode 3 has a higher potential than the electron-emitting film 5 (or the cathode electrode 2).

Here, the electron-emitting device according to the present invention has the structure in which electric fields near the two end portions A and B of the electron-emitting film 5 (see FIG. 2) are weaker than an electric field at the region between the two end portions A and B. Therefore, the electron emission can be preferentially produced at an arbitrary region between the two end portions A and B.

Thus, it is possible to reduce the nonuniformity of the electron-emitting characteristic of the film (in particular, non-uniformity in emitted electron distribution on the electron-emitting device using the film having two end portions, resulting from a difference between the electron-emitting characteristics of the two end portions and the electron-emitting characteristic of the region between the two end portions) which is the conventional problem.

Also, according to the present invention, a region having higher film uniformity of the electron-emitting film can be selectively used as the electron-emitting region by changing the shapes of the electrodes. Therefore, it is possible to provide an electron-emitting device having a uniform electron-emitting characteristic without improving the alignment precision of the electron-emitting film 5.

Further, when the plurality of electron-emitting devices according to the present invention as described above are arranged and the anode electrode having a light emitter such as a phosphor is prepared, an image display apparatus such as a display can be constructed.

According to the image display apparatus using the electron-emitting device according to the present invention as the electron source, the non-uniformity of brightness in each pixel can be reduced, with the result that the non-uniformity of brightness in the entire display region can be reduced.

EXAMPLES

Hereinafter, the present invention will be described in detail through examples.

Example 1

FIG. 2 shows the electron-emitting device according to Example 1 when it is viewed from above the base surface.

In FIG. 2, reference numeral 1 denotes the substrate; 2, the cathode electrode; 3, the gate electrode; and 5, the electron-emitting film. Note that the conductive layer 4 (not shown) is inserted between the cathode electrode 2 and the electron-emitting film 5, and a combination of the cathode electrode 2 and the conductive layer 4 is called the cathode electrode.

Here, quartz is used for the substrate 1, Pt is used for the cathode electrode 2 and the gate electrode 3, a graphite nanofiber is used for the electron-emitting film 5, and TiN is used for the conductive layer 4.

Also, according to the structure shown in FIG. 2, the conductive layer 4 and the electron-emitting film 5 are formed in substantially the same region. However, the conductive layer 4 may be formed so as to include a formation region of the electron-emitting film 5.

The electron-emitting film 5 is patterned in a strip shape with a predetermined width, and the two end portions A and B exist in the longitudinal direction of the strip.

According to the structure, the space between the gate electrode 3 and the cathode electrode 2 is not constant. The space in the region between the two end portions of the electron-emitting film 5 is wider than the space, in the vicinities of the two end portions of the electron-emitting film 5. Therefore, a distance between the end of the cathode electrode 2 and the electron-emitting film 5 is relatively large in each of the two end portions. In the region between the two end portions, the end of the cathode electrode 2 is close to the end of the electron-emitting film 5.

Next, a process of manufacturing the electron-emitting device according to this example will be described with reference to FIGS. 8A to 8E.

A quartz substrate was used as the substrate 1 and fully cleaned. After that, Ti and Pt as materials of the gate electrode 2 and the cathode electrode 3 were successively deposited by a sputtering method at thicknesses of 5 nm and 30 nm, respectively, thereby forming a Ti layer and a Pt layer.

Figure 8A:
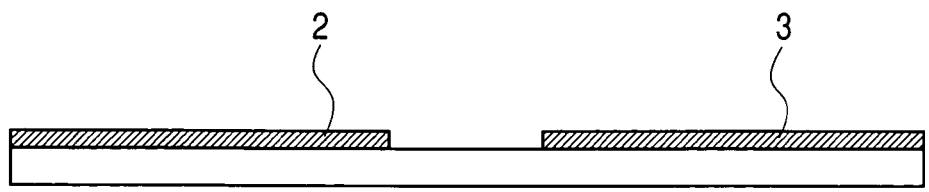
FIGS. 8A, 8B, 8C, 8D and 8E are schematic views showing an example of a method of manufacturing an electron-emitting device according to the present invention.

Next, a resist pattern was formed using a positive photoresist by a general photolithography process. Then, the Pt layer and the Ti layer were dry-etched by an Ar gas using the photoresist as a mask to form the gate electrode 2 and the cathode electrode 3 (FIG. 8A).

Figure 8B:
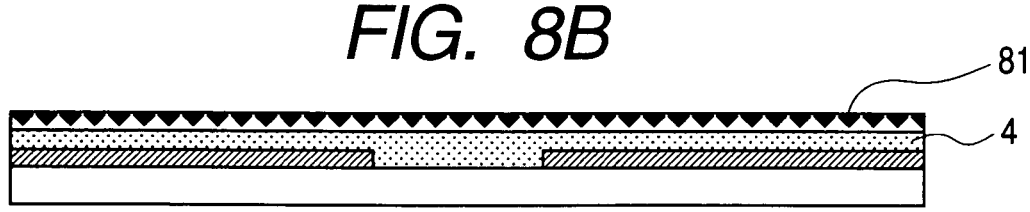

Next, the substrate temperature was kept at 300° C., and TiN was deposited at a thickness of 500 nm by a reactive sputtering method of sputtering Ti using an etching gas prepared by mixing nitrogen in Ar, thereby forming a TiN layer as the conductive layer 4. The substrate was sufficiently cooled to a room temperature, and then Pd was deposited by an amount enough to form an island shape by a sputtering method, thereby forming an island-shaped Pd layer 81 (FIG. 8B).

Figure 8C:
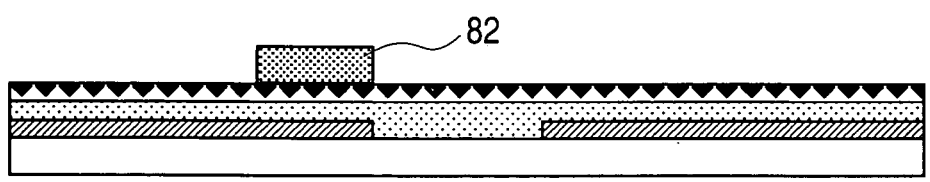
Figure 8D:
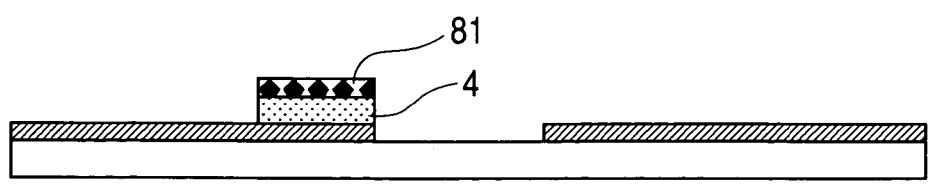

Next, a resist pattern was formed using a positive photoresist by a photolithography process (FIG. 8C). Then, the island-shaped Pd layer 81 and the TiN layer 4 were dry-etched by a $CF_4$ gas using the patterned photoresist 82 as a mask, thereby forming a metallic catalyst 81 (island-shaped Pd layer) with a desired pattern on the cathode electrode 2 (FIG. 8D).

Figure 8E:
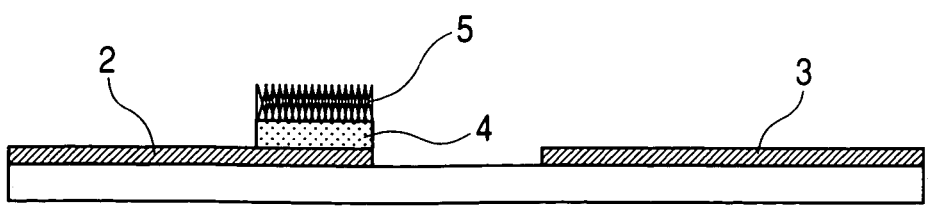
Figure 9:
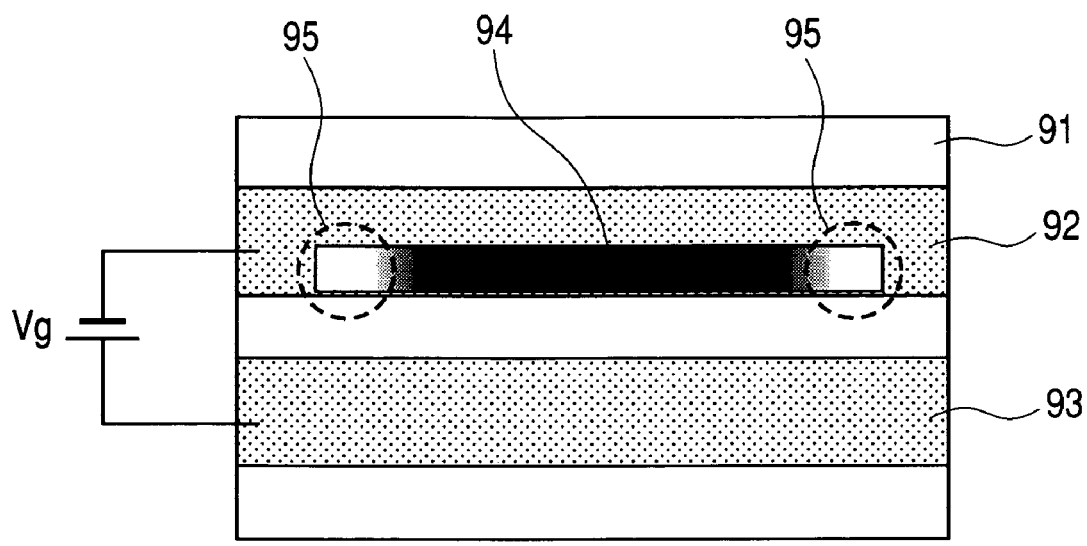
FIG. 9 is a schematic view showing an example of a conventional electron-emitting device.
Figure 10:
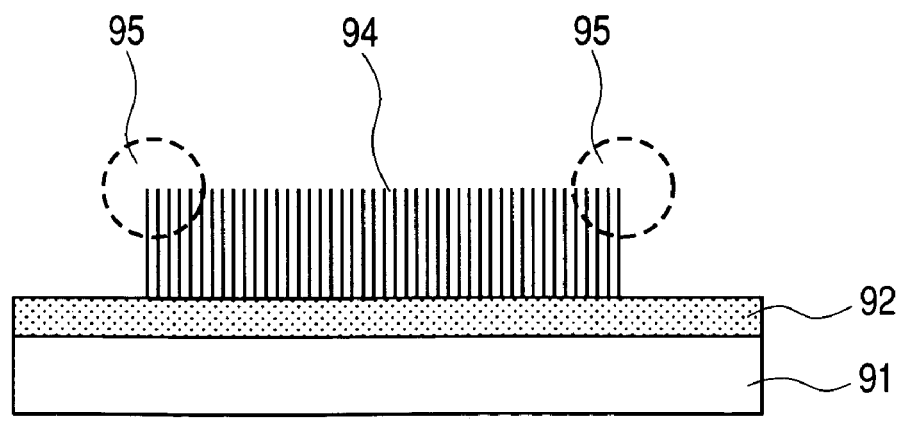
FIG. 10 is a schematic view showing an example of a cross sectional structure of the conventional electron-emitting device.

Next, heat treatment was performed at 500° C. for 10 minutes in a flow of gas prepared by mixing 1% hydrogen diluted with nitrogen at the atmospheric pressure and 0.1% acetylene diluted with nitrogen at the atmospheric pressure at about 1:1. As a result, the electron-emitting film 5 was formed on a region in which the metallic catalyst 81 was formed (FIG. 8E).

The electron-emitting film 5 was composed of a large number of carbon fibers (electron-emitting materials) which are fibrously extended while being partially bent. A diameter of each of the carbon fibers was the order of 5 nm to 250 nm. A film thickness of the electron-emitting film 5 was the order of several μm. Electron microscope observation and Raman spectroscopic analysis were performed on the carbon fibers. As a result, it was observed that the graphite nanofiber is formed.

Note that, in this example, the graphite nanofiber is used for the electron-emitting film 5. In addition to this, when a film containing a carbon fiber is used, the same operation is obtained. For example, a carbon nanotube, an amorphous carbon fiber, a diamond fiber, or the like can be used as the carbon fiber.

When a voltage is applied between the cathode electrode 2 and the gate electrode 3, because the cathode electrode 2 is equipotential, the electric field strengths applied to the two end portions A and B of the electron-emitting film 5 become weaker than the electric field strength applied to the region between the two end portions A and B. The electric field becomes weaker as the distance between the end of the cathode electrode 2 and the end of the electron-emitting film 5 increases. Therefore, in the structure shown in FIG. 2, a relatively stronger electric field is applied to the vicinity of the region of the electron-emitting film 5 in which the space between the cathode electrode 2 and the gate electrode 3 is wide. Thus, in the structure shown in FIG. 2, a threshold (voltage) required for election emission from the electron-emitting film 5, which is dependent on a potential of the gate electrode 3, becomes lower in the vicinity of the region of the electron-emitting film 5 in which the space between the cathode electrode 2 and the gate electrode 3 is wide.

When a voltage is applied between the cathode electrode 2 and the gate electrode 3 in the electron-emitting device having the above-mentioned structure, electrons can be selectively emitted from the electron-emitting film 5 in the vicinity of the region in which the space between the cathode electrode 2 and the gate electrode 3 is wide. As a result, the electron emission from the vicinities of the two end portions can be suppressed.

Figure 11:
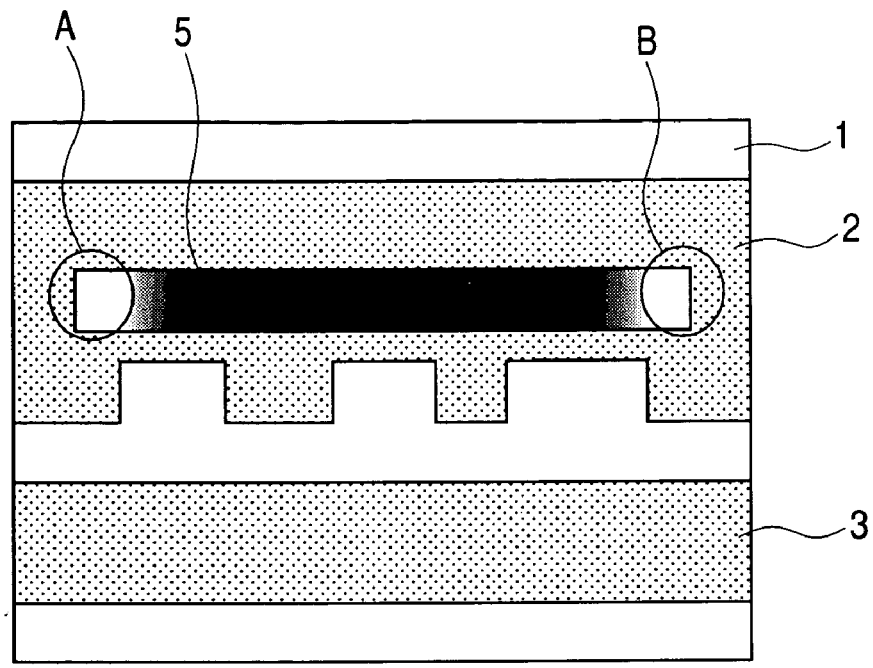
FIG. 11 is a schematic view showing an example of an electron-emitting device according to the present invention.
Figure 12:
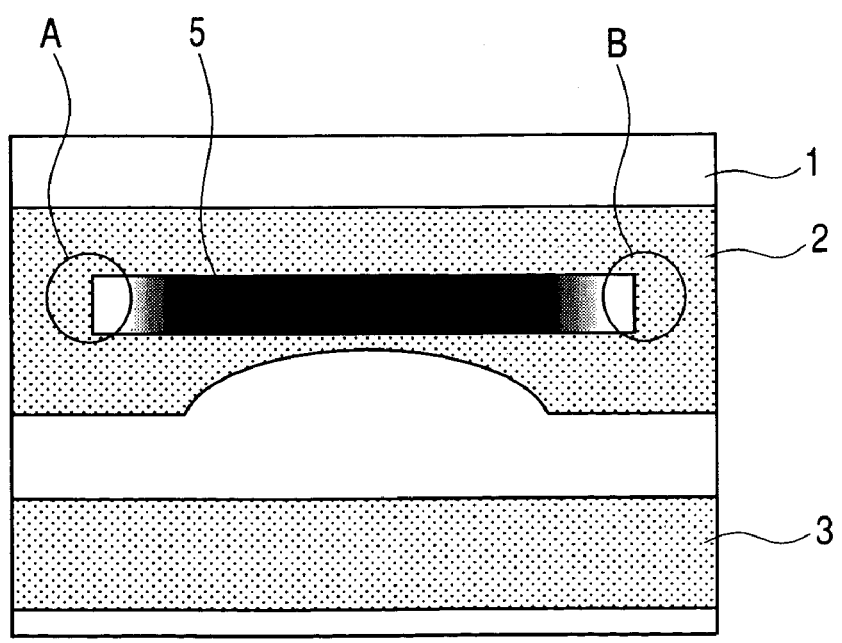
FIG. 12 is a schematic view showing an example of an electron-emitting device according to the present invention.

Also, as a modified example of Example 1, as shown in FIG. 11, the edge of the cathode electrode 2 may be formed in a plurality of concave and convex shapes when it is viewed from the gate electrode 3 side. When such shapes are used, the electron-emitting region can be divided into a plurality of regions. In addition, as shown in FIG. 12, a concave portion of the edge of the cathode electrode may be an elliptical concave shape.

Example 2

FIG. 3 shows the electron-emitting device according to Example 2 when it is viewed from above the base surface. The electron-emitting device according to this example can be manufactured by the same method as for the electron-emitting device described in Example 1. In addition, the same references are provided to the same members as in Example 1.

In the electron-emitting device according to this example, the space between the gate electrode 3 and the cathode electrode 2 is constant. The electron-emitting film 5 was elliptically patterned and the substantially two end portions A and B exist in a direction along a gap between the gate electrode 3 and the cathode electrode 2.

As is apparent from FIG. 3, the distance between the end of the cathode electrode 2 and the electron-emitting film 5 is relatively large in each of the end portions A and B. On the other hand, in the region between the end portions A and B, the end of the cathode electrode 2 is close to the end of the electron-emitting film 5.

That is, an area of a portion of the cathode electrode 2 between each of the two end portions of the electron-emitting film 5 and the gate electrode 3 is larger than an area of a portion of the cathode electrode 2 between the region located between the two end portions of the electron-emitting film 5 and the gate electrode 3.

When a voltage is applied between the cathode electrode 2 and the gate electrode 3 in the electron-emitting device according to this example, the electric field strengths in a direction along which the cathode electrode 2 and the gate electrode 3 are opposed to each other in the vicinities of the two end portions of the electron-emitting film 5 become weaker than the electric field strength in the direction in the region between the two end portions of the electron-emitting film 5. Therefore, a threshold required for election emission, which is dependent on a potential of the gate electrode 3, becomes lower in the region between the two end portions of the electron-emitting film 5, as compared with the vicinities of the two end portions of the electron-emitting film 5.

According to the electron-emitting device in this example, electrons can be selectively emitted from the region between the two end portions of the electron-emitting film 5, where the area of the portion of the cathode electrode 2 between the electron-emitting film 5 and the gate electrode 3 is smaller. Thus, the electron emission from the vicinities of the two end portions can be suppressed.

Example 3

FIG. 4 shows the electron-emitting device according to Example 3 when it is viewed from above the base surface. The electron-emitting device according to this example can be manufactured by the same method as for the electron-emitting device described in Example 1. In addition, the same references are provided to the same members as in Example 1.

The electron-emitting film 5 was patterned in a strip shape with a predetermined width. Therefore, the two end portions A and B exist in the longitudinal direction of the electron-emitting film 5.

The cathode electrode 2 protrudes more to the gate electrode 3 side in areas between each of the two end portions A and B of the electron-emitting film 5 and the gate electrode 3, as compared with an area between the region located between the two end portions of the electron-emitting film 5 and the gate electrode 3.

Thus, the space between the gate electrode 3 and the cathode electrode 2 is not constant but is wider in the region between the two end portions A and B of the electron-emitting film 5. That is, the end of the cathode electrode 2 is closer to the electron-emitting film 5 in the region between the two end portions, as compared with the vicinities of the end portions.

When a voltage is applied between the cathode electrode 2 and the gate electrode 3 in the electron-emitting device according to this example, the electric field strengths in a direction along which the cathode electrode 2 and the gate electrode 3 are opposed to each other in the vicinities of the two end portions of the electron-emitting film 5 become weaker than the electric field strength in the direction in the region between the two end portions A and B of the electron-emitting film 5. Therefore, a threshold required for election emission, which is dependent on a potential of the gate electrode 3, in the region between the two end portions of the electron-emitting film 5 becomes lower, as compared to that in the vicinities of the two end portions of the electron-emitting film 5.

According to the electron-emitting device in this example, the electron emission from the vicinities of the two end portions of the electron-emitting film 5 in which the cathode electrode 2 protrudes more to the gate electrode 3 side can be suppressed, and electrons can be selectively emitted from the region between the two end portions.

Also, the structure as shown in FIG. 5 may be used as a modified example of Example 3.

Example 4

FIG. 6 shows the electron-emitting device according to Example 4 when it is viewed from above the base surface. The electron-emitting device according to this example can be manufactured by the same method as for the electron-emitting device described in Example 1. In addition, the same references are provided to the same members as in Example 1.

The electron-emitting film 5 was patterned in a rectangular shape on the cathode electrode 2 in the plane substantially parallel to the base surface. In addition, the electron-emitting film 5 has the two end portions A and B in a direction substantially perpendicular to the direction along which the cathode electrode 2 and the gate electrode 3 are opposed to each other.

The gate electrode 3 was formed such that a distance therefrom to the region located between the two end portions of the electron-emitting film 5 becomes shorter than distances up to the two end portions of the electron-emitting film 5.

The electric field strength in the region in which the distance between the gate electrode 3 and the electron-emitting film 5 is shorter becomes higher than the electric field strength in other regions.

When a voltage is applied between the cathode electrode 2 and the gate electrode 3 in the electron-emitting device having such a structure, with respect to the electric field in the direction along which the cathode electrode 2 and the gate electrode 3 are opposed to each other, a larger electric field is applied to the electron-emitting film 5 in the region in which the distance between the gate electrode 3 and the electron-emitting film 5 is shorter. Therefore, electrons can be selectively emitted in the vicinity of the region.

Also, the structure as shown in FIG. 7 may be used as a modified example of Example 4.

The examples of the electron-emitting device according to the present invention have been described above. The present invention includes an electron source in which a plurality of electron-emitting devices as described above are formed, and an image forming apparatus which is composed of a combination of the electron source and a light emitting member made of a phosphor or the like.

According to the present invention, the electron-emitting device including the electron-emitting region having a small electron-emitting distribution can be provided, and the non-uniformity in electron-emitting characteristics between the electron-emitting devices can be reduced. Further, when an electron source in which the plurality of electron-emitting devices according to the present invention are arranged, an image forming apparatus capable of uniformly displaying an image having a preferable quality on a large area can be realized.

What is claimed is:

1. An electron-emitting device, comprising:
   a cathode electrode and a gate electrode, which are located on a surface of a substrate and opposed to each other with a space therebetween; and
   a film containing an electron-emitting material, which is located on the cathode electrode,
   wherein the film has two end portions, which are located in a plane substantially parallel to the surface and are located in a direction substantially perpendicular to a direction in which the cathode electrode and the gate electrode are opposed to each other,
   wherein an area of a portion of the cathode electrode which is located between each of the two end portions and the gate electrode in the plane is larger than an area of a portion of the cathode electrode which is located between a region located between the two end portions and the gate electrode.

2. An electron-emitting device, comprising:
   a cathode electrode and a gate electrode, which are located on a surface of a substrate and opposed to each other with a space therebetween; and
   a film containing an electron-emitting material, which is located on the cathode electrode,
   wherein the film has two end portions, which are located in a plane substantially parallel to the surface and are located in a direction substantially perpendicular to a direction along which the cathode electrode and the gate electrode are opposed to each other,
   wherein the cathode electrode has protruding portions in areas between each of the two end portions of the film and the gate electrode in a plane substantially parallel to the surface of the substrate, the protruding portions protruding more to the gate electrode side as compared with an area between a region located between the two end portions of the film and the gate electrode.

3. An electron-emitting device, comprising:
   a cathode electrode and a gate electrode, which are located on a surface of a substrate and opposed to each other with a space therebetween; and a film containing an electron-emitting material, which is located on the cathode electrode, wherein the film has two end portions, which are located in a plane substantially parallel to the surface and are located in a direction substantially perpendicular to a direction in which the cathode electrode and the gate electrode are opposed to each other, wherein the gate electrode has a shape in which a distance therefrom to a region located between the two end portions of the film is shorter than a distance therefrom to each of the two end portions of the film.

4. An electron-emitting device, comprising:

a cathode electrode and a gate electrode, which are located on a surface of a substrate and opposed to each other with a space therebetween; and a film containing an electron-emitting material, which is located on the cathode electrode, wherein the film has two end portions, which are located in a plane substantially parallel to the surface and are located in a direction substantially perpendicular to a direction along which the cathode electrode and the gate electrode are opposed to each other, wherein a distance from a center line between the cathode electrode and the gate electrode to a region located between the two end portions of the film is shorter than a distance from the center line to each of the two end portions of the film.

5. An electron-emitting device according to claim 1, wherein the film is composed of a plurality of carbon fibers.

6. An image display apparatus, comprising:
a plurality of electron emitting devices, each of which is an electron-emitting device according to claim 5; and
a light emitting member.

7. An electron-emitting device according to claim 2, wherein the film is composed of a plurality of carbon fibers.

8. An image display apparatus, comprising:
a plurality of electron emitting devices, each of which is an electron-emitting device according to claim 7; and
a light emitting member.

9. An electron-emitting device according to claim 3, wherein the film is composed of a plurality of carbon fibers.

10. An image display apparatus, comprising;
a plurality of electron emitting devices, each of which is an electron-emitting device according to claim 9; and
a light emitting member.

11. An electron-emitting device according to claim 4, wherein the film is composed of a plurality of carbon fibers.

12. An image display apparatus, comprising:
a plurality of electron emitting devices, each of which is an electron-emitting device according to claim 11; and
a light emitting member.

* * * * *